United States Patent [19]

Nakajiri et al.

[11] Patent Number: 4,947,268
[45] Date of Patent: Aug. 7, 1990

[54] DATA TRANSMISSION SYSTEM

[75] Inventors: Takashi Nakajiri; Masayuki Hachinoda, both of Nara; Masafumi Matsumoto, Asuka-Murakoshi; Matahira Kotani, Senohigashi, all of Japan

[73] Assignee: Sharp Kabushiki Kaisha, Abeno, Japan

[21] Appl. No.: 264,156

[22] Filed: Oct. 28, 1988

[30] Foreign Application Priority Data

Oct. 31, 1987 [JP] Japan ............................... 62-276282

[51] Int. Cl.⁵ ........................................... H04N 1/419
[52] U.S. Cl. .................................... 358/426; 358/427; 358/261.1; 358/431
[58] Field of Search ............... 358/261.1, 261.3, 261.2, 358/426, 427, 431; 370/79; 364/521, 518; 341/51

[56] References Cited

U.S. PATENT DOCUMENTS

| | | | |
|---|---|---|---|
| 4,270,148 | 5/1981 | Adachi | 358/260 |
| 4,297,727 | 10/1981 | Ogawa | 358/286 |
| 4,682,215 | 7/1987 | Adachi | 358/261.1 |
| 4,775,893 | 10/1988 | Ishikawa | 358/288 |

FOREIGN PATENT DOCUMENTS 56-43863 4/1981 Japan.
0106954 6/1983 Japan.

Primary Examiner—Edward L. Coles, Sr.
Assistant Examiner—Jerome Grant, II
Attorney, Agent, or Firm—Cohen, Pontani & Lieberman

[57] ABSTRACT

A data transmission system including a transmitter which has functions for encoding image data and transmitting it as one unit data, and a receiver which is connected to the transmitter over a communication line and has functions for sending its minimum transmission time to the transmitter and receiving one unit data from the transmitter, wherein the transmitter has a minimum transmission time detecting device for detecting the minimum transmission time of the receiver connected to the transmitter, a subtraction device for calculating deviation by subtracting the time required for transmitting each one unit data from the minimum transmission time detected by the minimum transmission time detecting device, an accumulating device for cumulatively storing deviations calculated by the subtraction device and an addition device for adding nul information to the one unit of data transmitted only when the sum of the deviations becomes less than zero.

4 Claims, 3 Drawing Sheets

DATA TRANSMISSION SYSTEM

BACKGROUND OF THE INVENTION

1. Field of the Invention

This invention relates to a data transmission system which encodes and transmits image information by using facsimile apparatus or other similar information transmission equipment.

2. Description of the Prior Art

In general, the Group 3 facsimile apparatus for document transmission are designed to transmit image information in accordance with the control procedure and the transmitting method stipulated in CCITT (International Telegraph and Telephone Consultative Committee) Recommendations T.30 and T.4. Recommendation T.4 of the CCITT stipulates the minimum transmission time of a total coded scan line (hereinafter called a line). In fact, the minimum transmission time of one line should conform to the standard of 20 milliseconds with other times such as 10 milliseconds and 5 milliseconds also approved as options.

The identification and choice of this minimum transmission time are communicated between the transmitting and receiving facsimile apparatus by the premessage procedure which conforms to the control procedure of CCITT Recommendation T.30.

The minimum transmission time is chiefly determined by the recording speed and the code buffer capacity which stores transmitted codes of the facsimile apparatus on the receiving side. In general, the facsimile apparatus internally holds such information.

A line of image information is composed of a series of variable length code words. Each code word represents a run length of either all white or all black. White runs and black runs alternate. The end-of-line (hereinafter called EOL) code word is inserted between data code words which correspond to the image information in a line and data code words which correspond to the image information in the next line. This EOL code word is added before data code words. In the event that the time required for transmitting the above-mentioned data code words and the EOL code word is less than the minimum transmission time, a Fill code word is added after the data code words. This ensures that a line with a small quantity of data code words has its transmission time extended beyond the minimum transmission time.

FIG. 3 shows the relationship of such code words. FIG. 3(1) explains the relationship among the transmitted code words which correspond to the first several lines of a manuscript image to be transmitted and FIG. 3(2) explains the relationship among the transmitted code words which correspond to the last line on the first page. The minimum transmission time $\Delta T$ per encoded line is determined by the pre-message procedure between the facsimile apparatus on the transmitting side and the receiving side. After the pre-message procedure including determination of the minimum transmission time $\Delta T$, etc., image information of the first line is transmitted. The transmitted code words of the first line consist of the EOL code word and the data code words D1. For example, the time $\Delta T1$ required for transmitting the code words of the first line is longer than the minimum transmission time $\Delta T$. The transmitted code words of the second line consist of the EOL code word, the data code words D2 and the Fill code word which represents nul information. The time $\Delta T2a$ required for transmitting the EOL code word and the data code word D2 is shorter than the minimum transmission time $\Delta T$. Therefore, the Fill code word is added. In this way, the time $\Delta T2$ required for transmitting the code words of the second line is at least as long as or longer than the minimum transmission time $\Delta T$.

As described above, in the event that the time required for transmitting the data code words and the EOL code word of a line is shorter than the minimum transmission time $\Delta T$, the Fill code word is added to make the above-mentioned time at least as long as or longer than the minimum transmission time $\Delta T$ as in the aforementioned second line.

Six EOL code words are normally added after the data code words of the last line on a page. The end of a document transmission is signified by sending six consecutive EOLs (the RTC signal) to the receiving facsimile apparatus. Following the RTC signal, the post-message procedure starts.

In the data transmission system as mentioned above, the Fill code word is inserted when there are only a few data words on a line and the time required for transmitting the EOL code word and the data code words is shorter than the minimum transmission time $\Delta T$. This Fill code word does not result in the transmission of any actual image and, as explained above, is inserted for the purpose of making the time required for transmitting a line as long as or longer than the minimum transmission time $\Delta T$. However, the time required for transmitting the total manuscript image is nevertheless made longer by this method.

The facsimile apparatus disclosed in the Japanese Published Unexamined Patent Application No. SHO56(1981)-43863 has a memory which stores the destination numbers of terminal locations and the specific parameters necessary to communicate with those terminals, and a means to judge whether or not the communication parameters of the destination number are stored when the number is input. As shown in the Japanese Published Unexamined Patent Application No. SHO53(1978)-122312, even if the Fill code word is added to data code words in the decoding circuit of the variable length code words, such facsimile apparatus as is able to securely detect the EOL code word in the same circuit is known. However, the above-mentioned problem can not be solved with these facsimile apparatus.

It is an object of the present invention to provide a data transmission system by which data transmitting speed is remarkably improved, minimizing the transmission of nul information which is normally inserted to make the time required for transmitting one unit data as long as or longer than the minimum transmission time in a data transmission system in which the minimum transmission time is set in accordance with the processing speed and other conditions of equipment specific to the receiving side apparatus.

SUMMARY OF THE INVENTION

The present invention relates to a data transmission system comprising a transmitter which has functions for encoding image data and transmitting it as one unit data, and a receiver which is connected to the transmitter over a communication line and has functions for sending its minimum transmission time to the transmitter and receiving one unit data from the transmitter, wherein the transmitter has minimum transmission time detecting means for detecting the minimum transmission time of the receiver connected to the transmitter, subtraction means for calculating deviations by subtracting the time required for transmitting each one unit data from the minimum transmission time detected by the minimum transmission time detecting means, accumulating means for cumulatively storing deviations calculated by the subtraction means and addition means for adding nul information to the one unit of data transmitted only when the sum of the deviations become less than zero.

The transmitter of the present invention may have change point detecting means for detecting the change points of multiple unit picture elements of image information. Further, the transmitter of the present invention may also have a minimum transmission time changing means for outputting a minimum transmission time shorter than the minimum transmission time detected by the minimum transmission time detecting means to the subtraction means when the change point detecting means detections are extremely few in number.

For the transmitter and the receiver of the present invention, facsimile apparatus are preferred. The receiver may be either one already known in this field or one which has the same transmitting means as the transmitter of the present invention.

DETAILED DESCRIPTION OF THE PREFERRED EMBODIMENTS

Basically a receiver and a transmitter of the present invention may have the same composition as a facsimile apparatus which meets the standard requirements of CCITT Group 3. The facsimile apparatus should have a key input component for inputting facsimile numbers and others, a scanner for reading manuscript images, an image information processor for encoding the read manuscript images for transmission, a communicating component for transmitting encoded images, and a recorder for printing received images on paper, and the functions of transmitting manuscript images and recording transmitted images on paper.

The one unit data of the present invention is basically composed of data code words which are encoded image information and the EOL code word which is transmitted prior to the transmission of data code words. When the case arises that it is necessary to add nul information to encode a line of image information, the one unit data is composed of the data code words, the EOL code word and nul information.

The addition means of the present invention does not add nul information to every one unit data which has a shorter transmission time than the minimum transmission time, but only when at least two or more one unit data are transmitted; the addition means adds nul information to the one unit data transmitted at the point in time when the accumulated value of all the deviations between the time required for transmitting each one unit data and the minimum transmission time becomes less than zero.

Therefore, if we compare the case where nul information is added whenever the transmission time of one unit data becomes shorter than the minimum transmission time, nul information which is included in transmission image information is minimized and data transmitting speed is remarkably improved.

Figure 1:
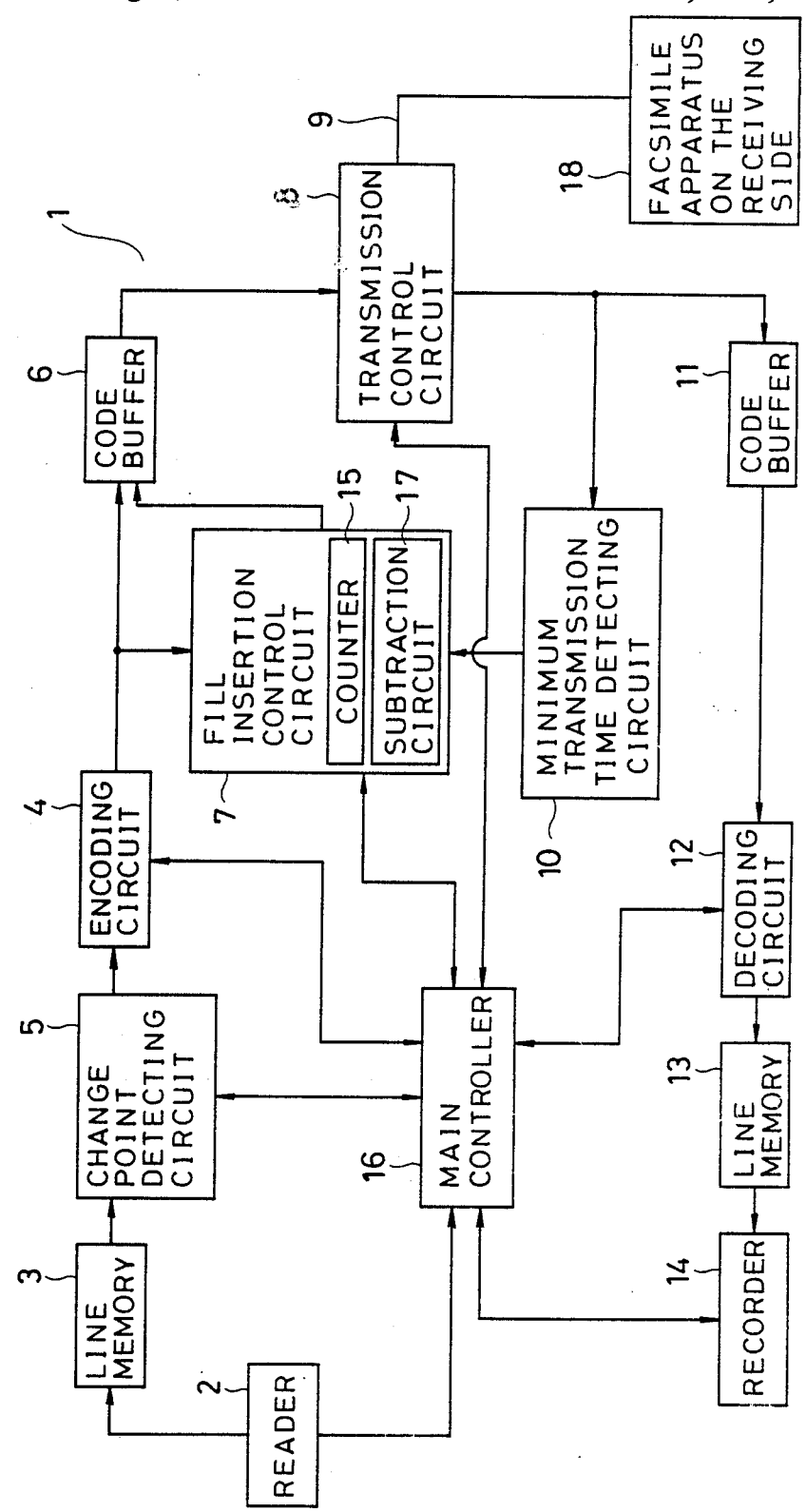
FIG. 1 is a block diagram showing the basic composition of a facsimile apparatus 1 according to an embodiment of the present invention.

Next, the embodiment of the facsimile apparatus 1 which is the transmitter of the present invention will be described with reference to FIG. 1.

A reader 2 which includes, for example, a CCD (charge coupled device) having 1728 picture elements, reads every unit picture element of manuscript images and every line, creating binary codes for the brightness value which corresponds to the brightness of each unit picture of either binary code data either as "0" or "1", for example, and outputs it to a line memory 3. Binary coding for the brightness values corresponds to white or black for each unit picture element. Change points from white picture elements to black picture elements or from black ones to white ones are detected by a main controller 16, composed of a microcomputer and a change point detecting circuit 5 which follows the line memory 3 and thus the image of binary code information becomes data code words which represent specific white or black run lengths. The main controller 16 controls an encoding circuit 4 and the encoding circuit 4 generates the code data which corresponds to white or black run length and outputs the code data to a code buffer 6.

A Fill insertion control circuit 7 changes the setting of the minimum transmission time T0 as mentioned below. It depends upon the number of change points in a line obtained by the change point detecting circuit 5 and the main controller 16. For instance, when the change points are extremely few in number, this indicates that the line does not include any, or only includes very few, black picture elements.

Data code words on a line which has been read are directed to the Fill insertion control circuit 7 by the encoding circuit 4. In a subtraction circuit 17 the minimum transmission time T0 detected by the minimum transmission time detecting circuit 10 mentioned hereinafter is subtracted from the time required for transmitting the data code words, by referring to the length of the sum of the data code words and the EOL code word added thereto, thereby calculating a particular difference or deviation. A counter 15, which is an accumulating means, cumulatively stores the quantity of codes which correspond to the deviation of the time required for transmitting data code words from the minimum transmission time T0. Based on the quantity of the codes accumulated in this way, i.e. the quantity of codes of the data code words given by the encoding circuit 4 and the minimum transmission time T0, the quantity of codes of the Fill code word to be inserted is calculated and the Fill code words in the quantity of codes thus calculated are supplied to the code buffer 6. An output of the code buffer 6 is provided to a transmission control circuit 8. The transmission control circuit 8 controls data transmission to a facsimile apparatus 18 on the receiving side over a telephone communication line 9.

When transmission codes including data code words, etc., are transmitted, the facsimile apparatus 18 on the receiving side gives data transmission control information to the transmission control circuit 8 over the telephone line 9. The data transmission control information includes the particular recording time of the facsimile apparatus 18 on the receiving side and information regarding the minimum transmission time T0 which is determined by the capacity of the code buffer and other factors. The minimum transmission time T0 is detected in the minimum transmission time detecting circuit 10 which is connected to the transmission control circuit 8. An output of the minimum transmission time detecting circuit 10 is directed to the Fill insertion control circuit 7.

The transmission codes directed to the transmission control circuit 8 of the facsimile apparatus 1 over the telephone line 9 are stored in a code buffer 11 when they are received. Output from the code buffer 11 is subsequently directed to a decoding circuit 12 and changed to a binary code image for each picture element and this information is directed to a line memory 13. Output from the line memory 13 is directed to a recorder 14 which comprises a thermal head, for example, and the manuscript images are recorded on recording paper (not shown).

The transmission control circuit 8 retains information on the processing speed of the particular facsimile apparatus 1 at the time of receiving, which depends on the recording speed of the particular recorder 14, and the capacity of the code buffer 11. Such information is transmitted to a facsimile apparatus on the transmitting side over the telephone line 9 at the time of receiving, whereby the facsimile apparatus on the transmitting side establishes the minimum transmission time.

In the Fill insertion control circuit 7, the minimum transmission time is controlled by the main controller 16 so that it changes between the minimum transmission time T0 given by the minimum transmission time detecting circuit 10 and w time which is half the minimum transmission time T0. Therefore, the main controller 16 functions as a minimum transmission time changing means. In the case where the number of change points detected by the change point detecting circuit 5 is extremely few in number indicating that there are few or no black picture elements in a read line, for example, the minimum transmission time is controlled as mentioned above because the decoding process in the facsimile apparatus 18 on the receiving side can be accommodated rapidly enough.

In the case that the minimum transmission time T0 is detected to be 20 milliseconds in the minimum transmission time detecting circuit 10, according to the information provided by the facsimile apparatus 18 on the receiving side, the minimum transmission time is changed between 20 milliseconds and 10 milliseconds in the Fill insertion control circuit 7 and in a line where all picture elements are white, the minimum transmission time is caused to be 10 milliseconds.

Figure 2:
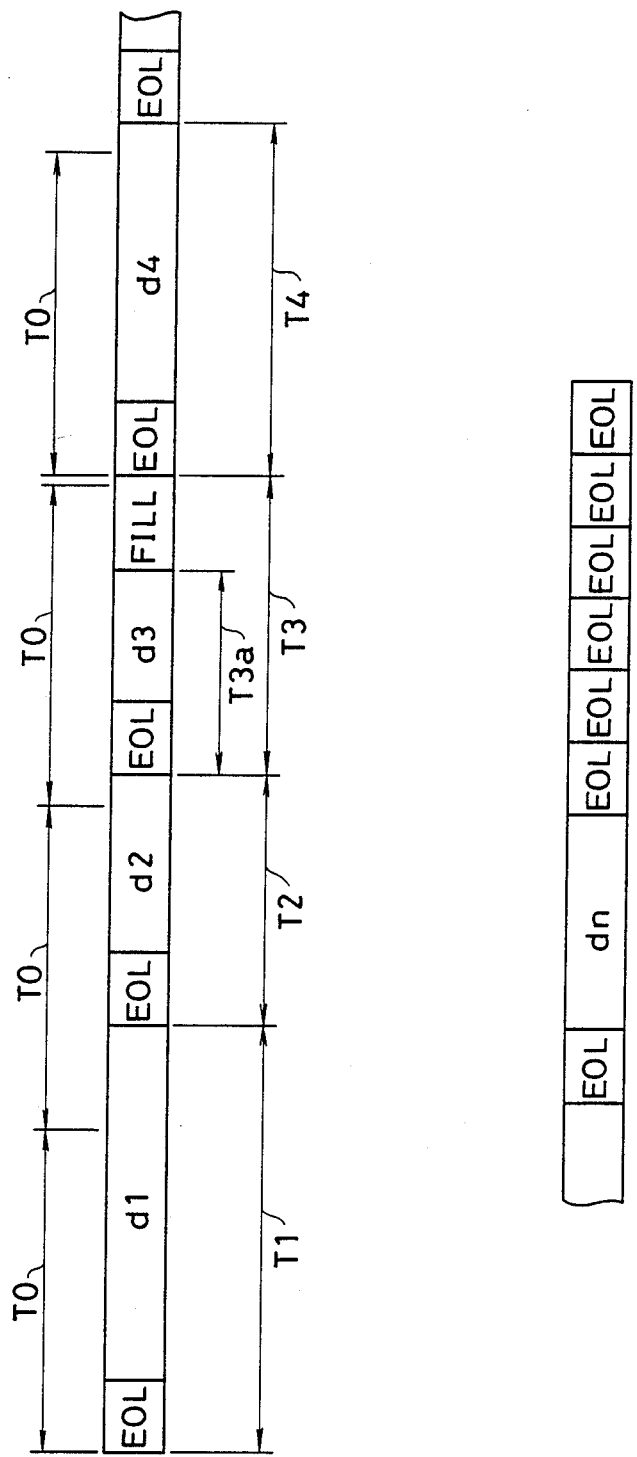
FIG. 2 is an illustration to explain data transmission made by the disclosed embodiment of the present invention.
Figure 3:
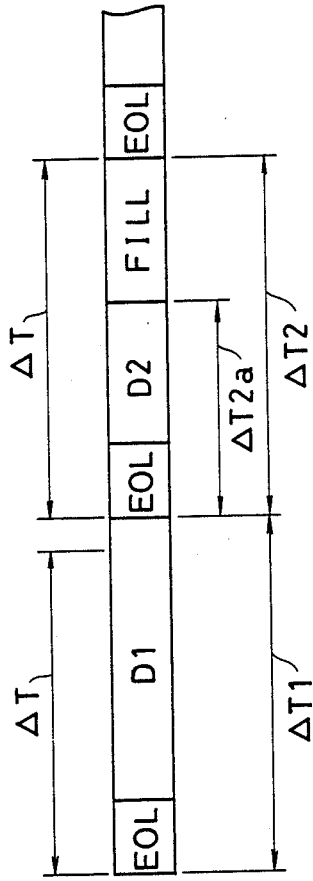
FIG. 3 is an illustration to explain data transmission made by conventional facsimile apparatus.
Figure 3:
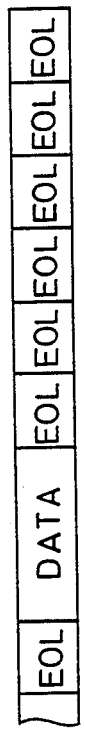

FIG. 2 is an illustration which explains data transmission effected by the embodiment of the invention where transmission codes transmitted by the facsimile apparatus 1 are shown. The transmission control circuit 8 receives data transmission control information from the facsimile apparatus 18 on the receiving side in accordance with the pre-message procedure. Based on this data transmission control information, the minimum transmission time T0 which corresponds to the facsimile apparatus 18 on the receiving side is detected in the minimum transmission time detecting circuit 10 and the output is directed to the Fill insertion control circuit 7. After that, when the transmission codes start being transmitted, the EOL code word is transmitted prior to the data code d1. The transmission codes of the first line are composed of the EOL code word and the data code d1 but the time required for its transmission T1 is longer than the minimum transmission time T0. In this case, the Fill insertion control circuit 7 comes into play and the quantity codes which correspond to (T1−T0) are accumulated in the counter 15.

After the transmission codes which correspond to the first line are transmitted, the EOL code word is transmitted again and then data code d2 of the second line is transmitted successively. In other words, the transmission codes of the second line are composed of the EOL code word and the data code d2. Although the time T2 required for transmitting the transmission codes of the second line is shorter than the minimum transmission time T0, the transmission codes of the second line do not include the Fill code word because $$T1+T2 > 2 \times T0 \tag{1}$$

The minimum transmission time T0 corresponds to the processing speed of the facsimile apparatus 18 on the receiving side. Even when the time required for transmitting the transmission codes of the second line is shorter than the minimum transmission time T0, the time required for transmitting the transmission codes of the first line is sufficiently long so that the above mentioned Inequality (1) is true, and the facsimile apparatus 18 on the receiving side is able to accommodate sufficiently without having to add the Fill code word to the transmission codes of the second line.

Thus, so long as the accumulated deviations Δ (the accumulation of deviations of time required for transmitting transmission codes to the minimum transmission time T0) which correspond to the quantity of the codes accumulated in the counter 15 fulfills the following condition:

$$\Delta \geq 0, \tag{2}$$

the Fill insertion control circuit 7 does not insert Fill code words into the transmission codes. On the other hand, where the condition:

$$\Delta < 0, \tag{3}$$

is fulfilled, the Fill insertion control circuit 7 inserts the Fill code word which corresponds to the absolute value of the accumulated deviations Δ into the transmission codes. When the transmission codes of the first line are transmitted, the accumulated deviations Δ are, for example, $$\Delta = T1 - T0 \tag{4}$$

and when the transmission codes of the second line are transmitted, the accumulated deviations Δ are as follows:

$$\Delta = (T-T0)+(T-T0) = T1+T2-2 \times T0 \tag{5}$$

Therefore, when the above-mentioned Inequality (1) holds true, the Inequality (2) also holds true and consequently a Fill code word is not inserted into the transmission codes of the second line.

After the transmission of the transmission codes of the second line is completed, the EOL code word is transmitted again and then data code d3 of the third line is transmitted. The time required for transmitting the data code d3 of the third line and the EOL code word T3a is shorter than the minimum transmission time T0 and, in this case, the accumulated deviations Δ are as follows:

$$\Delta = (T1-T0)+(T-T0)+(T3a-T0)$$
$$= T1+T2+T3a-3 \times T0 < 0 \qquad (6)$$

Therefore, a Fill code word having a length which corresponds to the absolute value of the accumulated deviations Δ shown in the Equation (6) is inserted in this case and the transmission codes of the third line are composed of the EOL code word, the data code d3 and the Fill code word. The time T3 required for transmitting the transmission codes of the third line is selected to be the shortest value that fulfills the following condition:

$$T1+T2+T3 \geq 3 \times T0 \qquad (7)$$

As a result, the time required for transmitting the transmission codes of the first line through the third line becomes at least three times the minimum transmission time T0. Therefore, the facsimile apparatus 18 on the receiving side is able to sufficiently accommodate this transmitted data. At this time the accumulated deviations Δ are reset and the value becomes 0. In other words, the counter 15 is reset by a signal from the main controller 16 and the count value of the counter 15 becomes 0.

After the transmission codes of the third line are finished being transmitted, data code d4 of the fourth line starts to be transmitted, after the EOL code word. Since the time required for transmitting the EOL code word and the data d4 is longer than the minimum transmission time T0, the transmission codes of the fourth line are composed of the EOL code word and the data code d4. A required transmission time T4 is as follows:

$$T4 > T0 \qquad (8)$$

The accumulated deviations Δ are reset at the time of the transmission codes of the third line, and the accumulated deviation Δ becomes as follows:

$$\Delta = T4 - T0 \qquad (9)$$

Similar processing is performed thereafter. The Fill code word is not inserted so long as the Inequality (2) holds true. In a line where the Inequality (3) holds true, the Fill code word is inserted and the accumulated deviations Δ are then reset.

After data code dn of the last line on a page is finished being transmitted, six EOL code words are transmitted in succession whereby the facsimile apparatus 18 on the receiving side recognizes the end of data transmission on that page. After that, the control signal of the post-message procedure commences.

In the disclosed embodiment, deviations of a required transmission time to the minimum transmission time T0 are accumulated in the Fill insertion control circuit 7 and the accumulated deviations Δ are obtained as mentioned above. In the event that these accumulated deviations Δ fulfill the Inequality (2), that is, when the total time required for transmitting a continuous m lines is more than m times the minimum transmission time T0, a Fill code word is not inserted. In the event that the accumulated deviations Δ fulfill the Inequality (3), a Fill code word is inserted into the transmission codes which correspond to the line at the point in time when the accumulated deviations Δ fulfill the Inequality (3).

Therefore, a Fill code word is not inserted when the time required for transmitting the transmission codes of each line is shorter than the minimum transmission time T0, but is inserted only when the Inequality (3) holds true. For this reason, the quantity of inserted Fill code words is decreased overall and, consequently compared with a conventional data transmission system, the transmitting speed of the transmission codes is greatly improved in accordance with the invention.

As described above, in a data transmission system in which the minimum transmission time is established according to the processing speed of a receiver, the present invention decreases the quantity of nul information which is inserted so that the time required for transmitting one unit data exceeds the minimum transmission time and thus the data transmitting speed is remarkably improved.

What is claimed is:

1. A data transmission system, comprising:
    a transmitter which has functions for encoding image data and transmitting it as one unit data; and
    a receiver which is connected to the transmitter over a communication line and has functions for sending its minimum transmission time to the transmitter and receiving one unit data from the transmitter;
    said transmitter comprising:
        minimum transmission time detecting means for detecting the minimum transmission time of the receiver connected to the transmitter;
        subtraction means for calculating a deviation for each said one unit data by subtracting for each said one unit data the time required for transmitting the one unit data from the minimum transmission time detected by said minimum transmission time detecting means;
        accumulating means for cumulatively storing a sum of the deviations calculated by said subtraction means for a plurality of said one unit data; and
        addition means for adding nul information to the transmitted one unit data only when said sum of the deviations for a plurality of said one unit data is less than zero.

2. The transmission system of claim 1, wherein each of said transmitter and receiver comprise facsimile apparatus.

3. A data transmission system, comprising:
    a transmitter which has functions for encoding image data and transmitting it as one unit data; and
    a receiver which is connected to the transmitter over a communication line and has functions for sending its minimum transmission time to the transmitter and receiving one unit data from the transmitter;
    said transmitter comprising:
        minimum transmission time detecting means for detecting the minimum transmission time of the receiver connected to the transmitter;
        subtraction means for calculating deviations by subtracting the time required for transmitting each one unit data from the minimum transmission time detected by the minimum transmission time detecting means;
        accumulating means for storing cumulatively deviations calculated by the subtraction means;
        addition means for adding nul information to the one unit data transmitted only when the sum of the deviations become less than zero;

change point detecting means for detecting the change points of multiple unit picture elements of image information; and minimum transmission time changing means for outputting a minimum transmission time shorter than the minimum transmission time detected by the minimum transmission time detecting means to the subtraction means when the change points detected by the change point detecting means are extremely few in number.

4. The data transmission system of claim 3, wherein each of said transmitter and receiver comprise facsimile apparatus.

* * * * *